(12) United States Patent
Raynesford

(10) Patent No.: US 11,907,779 B2
(45) Date of Patent: Feb. 20, 2024

(54) PASSIVE-RADIO FREQUENCY BLOCKING OF SIDE-LOBE READS

(71) Applicant: Sensormatic Electronics, LLC, Boca Raton, FL (US)

(72) Inventor: Steven J. Raynesford, Mission Viejo, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 275 days.

(21) Appl. No.: 16/996,526

(22) Filed: Aug. 18, 2020

(65) Prior Publication Data
US 2022/0052435 A1  Feb. 17, 2022

Related U.S. Application Data

(60) Provisional application No. 63/066,512, filed on Aug. 17, 2020.

(51) Int. Cl.
*H01Q 1/22* (2006.01)
*G06K 19/00* (2006.01)
*G06K 7/00* (2006.01)

(52) U.S. Cl.
CPC ............. *G06K 19/00* (2013.01); *G06K 7/00* (2013.01); *G06K 7/0008* (2013.01)

(58) Field of Classification Search
CPC .... G06K 19/00; G06K 7/0008; H01Q 1/2216; H01Q 3/2629
See application file for complete search history.

(56) References Cited

U.S. PATENT DOCUMENTS

| 6,353,406 B1* | 3/2002 | Lanzl ................... G01S 13/878 340/8.1 |
| 2005/0231367 A1* | 10/2005 | Bellantoni ............ G06K 7/0008 340/572.1 |

FOREIGN PATENT DOCUMENTS

| EP | 2922144 A1 * | 9/2015 | ............ G01S 13/781 |
| WO | WO-2020109819 A1 * | 6/2020 | ............ G06K 7/0008 |

* cited by examiner

*Primary Examiner* — Quan Zhen Wang
*Assistant Examiner* — Rajsheed O Black-Childress
(74) *Attorney, Agent, or Firm* — ARENTFOX SCHIFF LLP (57) ABSTRACT

A radio-frequency (RF) identification (RFID) system provides side-lobe blocking (SLB) functionality. The RFID system modifies a first RF signal to provide a modified signal. The first RF signal has an RF carrier frequency according to an RFID protocol, and a main directional antenna in the RFID system has a first main lobe extending in a first direction and is configured to radiate a first signal for reading one or more RFID tags according to the RFID protocol. The RFID system then provides the modified signal as an SLB signal to a secondary directional antenna having a second main lobe extending in a second direction different than the first direction to radiate a second signal toward one or more stray RFID tags.

22 Claims, 4 Drawing Sheets

PASSIVE-RADIO FREQUENCY BLOCKING OF SIDE-LOBE READS

CROSS-REFERENCE TO RELATED APPLICATION(S)

This application claims the benefit of U.S. Provisional Application Ser. No. 63/066,512, entitled "PASSIVE RADIO-FREQUENCY BLOCKING OF SIDE-LOBE READS" and filed on Aug. 17, 2020, which is expressly incorporated by reference herein in its entirety.

BACKGROUND

The present disclosure relates generally to radio-frequency (RF) identification (RFID) and more specifically to passive-RF blocking of side-lobe reads.

Directional antennas, such as patch antennas, radiate most of their input power in a specific (or primary) direction, which may be referred to as the main lobe. The main lobe of a directional antenna may be extended, for example, in a forward direction in front of the directional antenna. Due to imperfect and/or limited elements in an antenna design, a directional antenna may also radiate power in the direction of additional lobes extended to the sides and/or opposite to the main lobe. Such lobes extended to the sides and/or behind a directional antenna may be collectively referred to as side-lobes of the directional antenna. A directional antenna also provides "reciprocity," meaning the directional antenna can receive power from the main lobe and the side-lobes in the same directional proportions as the directional antenna radiates power.

An RFID interrogator (also referred to as an RFID reader) configured to read RFID tags may include a directional antenna and may be installed to take advantage of the directionality of the directional antenna. For example, the RFID interrogator may be installed such as to limit the visible field of the RFID interrogator to an area covered by the main lobe radiation of the directional antenna. Such an area may be referred to as an intended area (e.g., an area intended for an RFID interrogator to communicate with RFID tags). Although the RFID interrogator may be installed in such a way as to communicate with those RFID tags that are located in the intended area, the side-lobes of the directional antenna may allow for communication with RFID tags that are outside the intended area (e.g., RFID tags located to the side and/or back of the directional antenna). Such unintended RFID tags that are unintentionally read by the RFID interrogator may be referred to as "stray" RFID tags, as the RFID interrogator may not be able to distinguish the direction of the reading of the stray RFID tags relative to the directional antenna.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for side-lobe blocking (SLB).

In an aspect, a method in a radio-frequency (RF) identification (RFID) system includes modifying a first RF signal to provide a modified signal, wherein the first RF signal has an RF carrier frequency according to an RFID protocol, wherein a main directional antenna in the RFID system has a first main lobe extending in a first direction and is configured to radiate a first signal for reading one or more RFID tags according to the RFID protocol. The method further includes providing the modified signal as an input signal to a secondary directional antenna having a second main lobe extending in a second direction different than the first direction to radiate a second signal toward one or more stray RFID tags.

In another aspect, an RFID system includes a signal generator configured for generating a modulating signal, and an RF mixer configured for modulating a first RF signal with the modulating signal to provide a modulated signal, wherein the first RF signal has an RF carrier frequency according to an RFID protocol, wherein a main directional antenna in the RFID system has a first main lobe extending in a first direction and is configured to radiate a first signal for reading one or more RFID tags according to the RFID protocol, wherein the RF mixer is further configured to provide the modulated signal as an input signal to a secondary directional antenna having a second main lobe extending in a second direction different than the first direction to radiate a second signal toward one or more stray RFID tags.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a radio-frequency (RF) identification (RFID) system in which an RFID reader drives a main directional antenna to read one or more intended RFID tags while a side-lobe blocking (SLB) circuit (which may be a passive RF circuit) drives a secondary directional antenna to radiate toward one or more stray RFID tags (e.g., tags positioned in one or more side-lobes of the main directional antenna) to thereby reduce or prevent stray RFID tag reads by the RFID reader.

In an aspect, for example, preventing the RFID reader from reading a stray RFID tag may be achieved by: (1) preventing the stray RFID tag from properly decoding the RFID reader's transmitted data; and/or (2) preventing the RFID reader from properly decoding the backscattered communication of the stray RFID tag.

In an aspect, in order to prevent a stray RFID tag from properly decoding an RFID reader's transmitted data, a blocking signal may be superimposed on the transmission from the RFID reader to the stray RFID tag to prevent the stray RFID tag from participating in inventory rounds performed according to, e.g., the RFID protocols described by Electronic Product Code (EPC) global Class 1 Generation 2 (EPC C1G2) standard. As a result, the stray RFID tag does not backscatter any response (e.g., does not reflect any energy back at the RFID reader) and thus does not take any processing bandwidth of the RFID reader.

In an alternative and/or additional aspect, in order to prevent an RFID reader from decoding the backscattered communication from a stray RFID tag, an additional blocking signal may be superimposed on the backscattered response of the stray RFID tag. In this case, the stray RFID tag may still consume processing bandwidth of the RFID reader during an inventory round.

In an aspect, for example, a blocking signal may be superimposed on the RF carrier and radiated in the direction of the stray RFID tags that are to be excluded from the reads of an RFID reader.

Turning now to the figures, example aspects are depicted with reference to one or more components described herein, where components in dashed lines may be optional.

Figure 1:
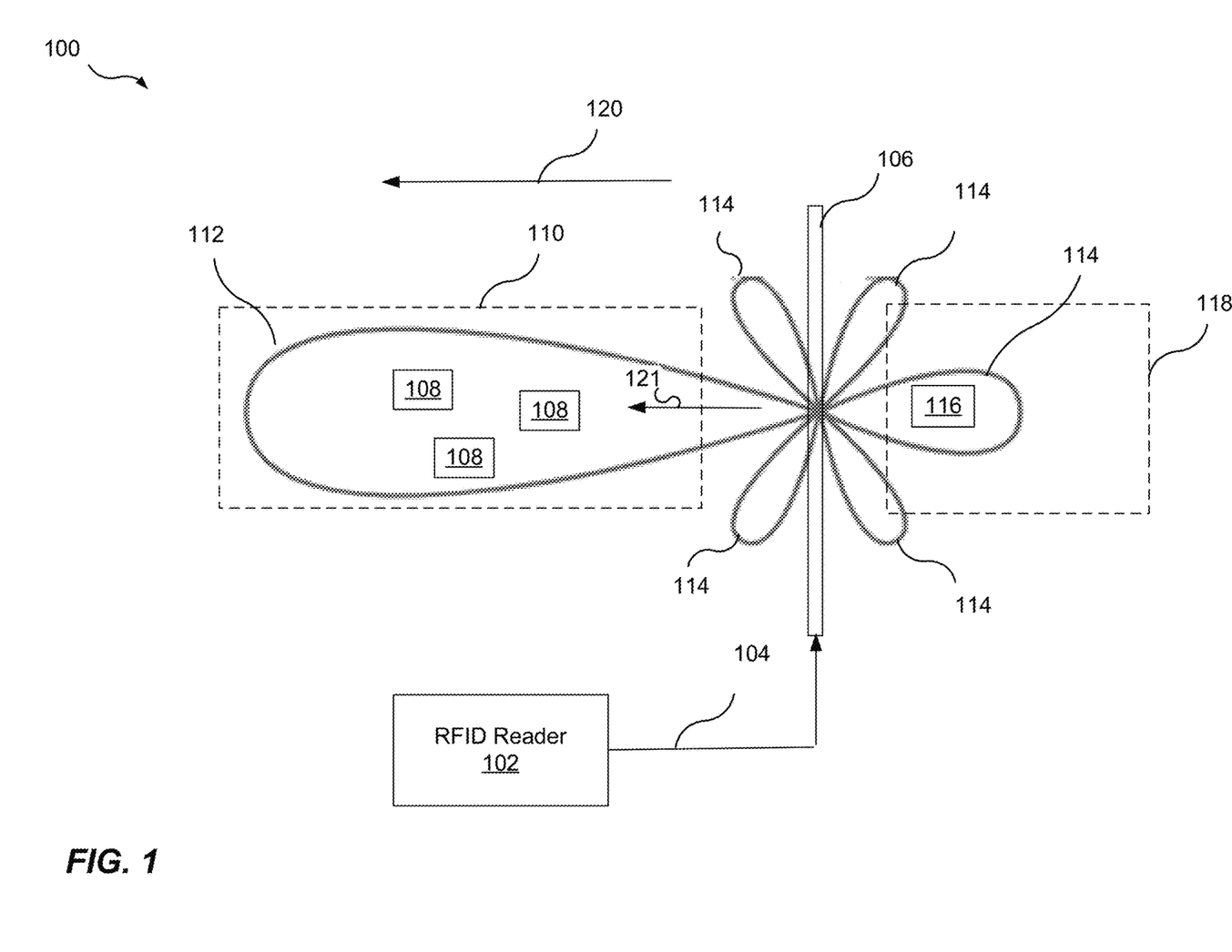
FIG. 1 is a schematic diagram of a first example radio-frequency (RF) identification (RFID) system, according to aspects of the present disclosure.

Referring to FIG. 1, in one non-limiting aspect, a first RFID system 100 includes an RFID reader 102 (or interrogator) that is configured to read one or more intended RFID tags 108 by providing an input signal 104 to a main directional antenna 106 according to an RFID protocol. The main directional antenna 106 radiates most of the power provided by the input signal 104 in the direction of a main lobe 112. The main lobe 112 of the main directional antenna 106 may be extended, for example, in a forward direction 120 in front of the main directional antenna 106. The first RFID system 100 may be implemented, for example, in a handheld device, a store theft prevention pedestal, a point of sale device, etc.

Due to imperfect and/or limited elements in an antenna design, the main directional antenna 106 may also radiate at least a portion of the power provided by the input signal 104 in the direction of additional lobes extended to the sides of the main lobe 112 and/or extended opposite to the main lobe 112. Such additional lobes may be collectively referred to as side-lobes 114 of the main directional antenna 106. In one non-limiting aspect, for example, the side-lobes 114 may radiate at least 15 dB lower power as compared to the main lobe 112.

The main directional antenna 106 also provides "reciprocity," meaning the main directional antenna 106 may receive power from the main lobe 112 and the side-lobes 114 in the same directional proportions as the main directional antenna 106 radiates in the directions of the main lobe 112 and the side-lobes 114.

In an aspect, the area substantially covered by the main lobe 112 of the main directional antenna 106 may be referred to as an intended area 110, e.g., the area intended for the RFID reader 102 to communicate with one or more intended RFID tags 108. However, the side-lobes 114 of the main directional antenna 106 may cause the RFID reader 102 to unintentionally communicate with one or more stray RFID tags 116 that are located outside the intended area 110, e.g., located in an unintended area 118 behind the main directional antenna 106. In this case, the RFID reader 102 may unintentionally read one or more stray RFID tags 116 and may not be able to distinguish the direction of the reading of the stray RFID tags 116 relative to the main directional antenna 106.

However, in some present aspects, in order to reduce or prevent stray tag reads, an SLB circuit applies a blocking signal as sidebands on an RF carrier defined by the RFID protocol, and the resultant RF signal is directed to an additional directional antenna that radiates in the direction of the undesired/unintended tags, e.g., the one or more stray RFID tags 116. In one non-limiting aspect, for example, the input signal 104 of the main directional antenna 106 is tapped and the tapped portion of the input signal 104 is directed to the SLB circuit.

For example, in an aspect, the data encoded in the signal radiated by the main directional antenna 106 is embedded in a narrow bandwidth in the sidebands of the RF carrier (e.g., ~50 kHz from the RF carrier) according to the RFID protocol. Also, an RFID tag that receives the radiated signal and successfully decodes the data encoded in the radiated signal backscatters in another narrow bandwidth in the sidebands of the RF carrier (e.g., 150 kHz~450 kHz from the RF carrier) according to the RFID protocol. Thus, the frequency of the blocking signal may be selected to interfere with: (1) the bandwidth used for the data encoded in the signals from the main directional antenna 106 according to the RFID protocol; and/or (2) the bandwidth used for the data encoded in the signals backscattered by a stray RFID tag 116 according to the RFID protocol.

In one aspect, for example, the frequency of the blocking signal may be selected such that the superposition of the blocking signal on the sidebands of the RF carrier causes the one or more stray RFID tags 116 to be unable to decode the data encoded in the signal from the main directional antenna 106. Thus, the one or more stray RFID tags 116 are unable to backscatter to the main directional antenna 106.

In an alternative and/or additional aspect, even if the stray RFID tags 116 are able to receive and decode signals from the main directional antenna 106, the frequency of the blocking signal may be selected such that the superposition of the blocking signal on the sidebands of the RF carrier causes the main directional antenna 106 to be unable to decode the data encoded by the one or more stray RFID tags 116 in signals backscattered to the main directional antenna 106.

In an aspect, for example, the additional directional antenna may be configured and installed to radiate in the direction of one or more side-lobes 114 of the main directional antenna 106. For example, in one non-limiting aspect, the additional directional antenna may be configured and installed to radiate in the direction of a side-lobe 114 of the main directional antenna 106 that extends in a direction opposite to the forward direction 120 of the main directional antenna 106.

In one non-limiting aspect, for example, the additional directional antenna may be identical to the main directional antenna 106, e.g., have a same aspect ratio, a same mounting system, etc. In this aspect, the additional directional antenna and the main directional antenna 106 may be installed back to back, e.g., facing in opposite directions as compared to each other.

Figure 2:
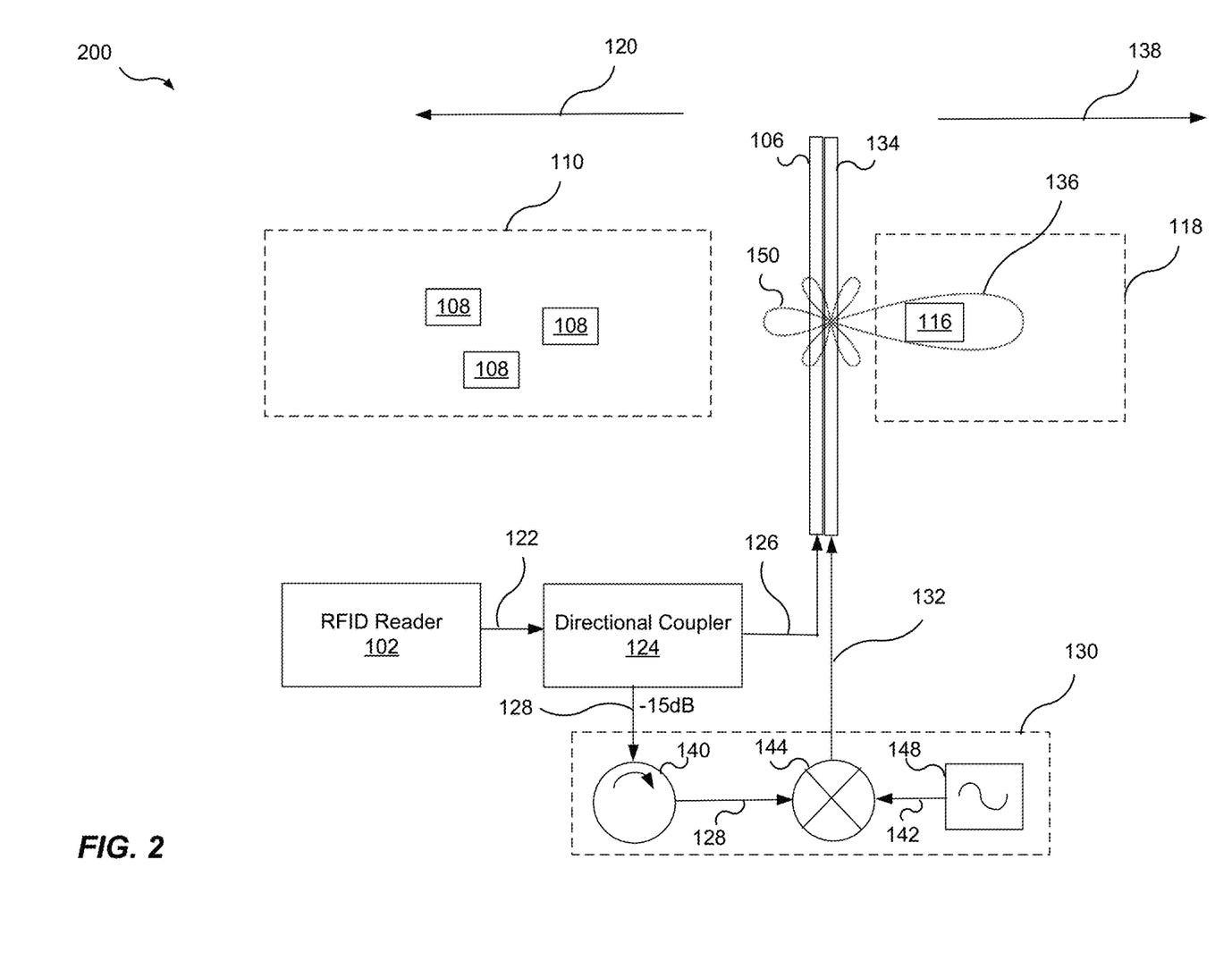
FIG. 2 is a schematic diagram of a second example RFID system, according to aspects of the present disclosure.

Referring to FIG. 2, in one non-limiting aspect, for example, a second RFID system 200 includes the components described above with reference to the first RFID system 100 in FIG. 1, but also includes a directional coupler 124 configured to receive an output signal 122 of the RFID reader 102 and generate an input signal 126 to the main directional antenna 106 while also directing a portion of the output signal 122 of the RFID reader 102 as a tapped signal 128 to an SLB circuit 130. The SLB circuit 130 is configured to receive the tapped signal 128 and output an SLB signal 132 to a secondary directional antenna 134. The secondary directional antenna 134 is configured and arranged to radiate most of the power provided by the SLB signal 132 in the direction of a secondary directional antenna main lobe 136 which extends in a second direction 138 in front of the secondary directional antenna 134 and behind the main directional antenna 106.

In one non-limiting aspect, the second direction 138 is the direction in which the secondary directional antenna 134 faces, and is opposite the forward direction 120 of the main directional antenna 106.

In one non-limiting aspect, the directional coupler 124 directs about 6% or −15 dB of the output signal 122 of the RFID reader 102 as the tapped signal 128 to the SLB circuit 130. In one non-limiting aspect, the SLB signal 132 that is input to the secondary directional antenna 134 is 15 dB lower in magnitude as compared to the input signal 126 that is input to the main directional antenna 106.

In an aspect, the area substantially covered by the secondary directional antenna main lobe 136 of the secondary directional antenna 134 substantially overlaps with the unintended area 118 where the stray RFID tags 116 are located. Accordingly, the stray RFID tags 116 receive a superposition of the signals radiated in the unintended area 118 by one or more side-lobes 114 of the main directional antenna 106 and by the secondary directional antenna main lobe 136 of the secondary directional antenna 134. Thus, in an aspect, the SLB signal 132 may be configured to result in superimposed radiations in the unintended area 118 that prevent the stray RFID tags 116 from decoding the signals radiated by the main directional antenna 106 in the unintended area 118.

More specifically, for example, in one non-limiting aspect, the SLB circuit 130 includes a circulator 140, an RF mixer 144, and a signal generator 148. In one non-limiting aspect, the circulator 140 is a passive RF circuit configured to receive the tapped signal 128 from the directional coupler 124 and direct the tapped signal 128 to the RF mixer 144, without allowing any energy to flow back to the directional coupler 124. The RF mixer 144 modulates the tapped signal 128 with a modulating signal 142 output by the signal generator 148 to generate the SLB signal 132. In one non-limiting aspect, for example, the modulating signal 142 output by the signal generator 148 may be a square wave or a sinusoid.

In one non-limiting aspect, for example, the RFID reader 102 may be a frequency-hopping U.S. reader at +30 dBm, and the modulating signal 142 output by the signal generator 148 may be a 240 kHz 0.3 Vpp sine-wave signal. In this case, when the signal generator 148 is off, the stray RFID tags 116 are visible to (and are read by) the RFID reader 102, but turning on the signal generator 148 causes the stray RFID tags 116 to become invisible to the RFID reader 102 as the stray RFID tags 116 are unable to decode the received superimposed signals radiated by the main directional antenna 106 and the secondary directional antenna 134, and are therefore unable to backscatter in response.

In one non-limiting aspect, for example, the modulating signal 142 output by the signal generator 148 may be a 50 kHz square wave, and may have several harmonics at, e.g., 100 kHz, 150 kHz, . . . , 500 kHz. In this case, due to the 50 kHz frequency of the square wave, the signal radiated by the secondary directional antenna 134 in the unintended area 118 may cause the stray RFID tags 116 to be unable to decode the data encoded in the signal radiated by the main directional antenna 106 in the unintended area 118. Further, even if the stray RFID tags 116 are able to receive and decode signals from the main directional antenna 106, due to the harmonics of the square wave at, e.g., 100 kHz, 150 kHz, . . . , 500 kHz, the signal radiated by the secondary directional antenna 134 may cause the main directional antenna 106 to be unable to decode the data encoded by the stray RFID tags 116 in signals backscattered by the stray RFID tags 116 to the main directional antenna 106.

Optionally, in an aspect, the SLB circuit 130 may be selectively disabled to permit tag visibility of the stray RFID tags 116 to the RFID reader 102. In an aspect, for example, the SLB circuit 130 may be selectively disabled in order to read all RFID tags in a vicinity of the RFID reader 102.

Optionally, in an aspect, the directivity peak of the secondary directional antenna 134 (e.g., the direction of the secondary directional antenna main lobe 136) may be actively steered, either physically or electronically, to favor a specific direction.

Optionally, in an aspect, the gain peak frequency of the secondary directional antenna 134 may be adjustable to favor a specific frequency band.

Optionally, in an aspect, SLB functionality may be limited to received signals on specific frequencies, for example, by using fixed or tunable filters and/or by antenna tuning of the secondary directional antenna 134.

Optionally, in an aspect, the SLB functionality may be limited to specific directions. In an aspect, for example, the second RFID system 200 may include multiple secondary directional antennas, and each of the secondary directional antennas may be configured and arranged to prevent or reduce the reads of stray RFID tags at certain areas or directions. For example, in an aspect, one secondary directional antenna may be configured and arranged to prevent or reduce the reads of stray RFID tags located behind the main directional antenna 106, another secondary directional antenna may be configured and arranged to prevent or reduce the reads of stray RFID tags located to the left or right of the main directional antenna 106, and so on.

In another non-limiting alternative and/or additional aspect, for example, a secondary directional antenna may be configured and arranged to prevent or reduce the reads of stray RFID tags located on a sale table.

Optionally, in an aspect, the SLB functionality may include controlling or selecting blocking signal parameters. For example, in an aspect, an amplitude and/or frequency of the signal radiated by the secondary directional antenna 134 may be adjusted by adjusting an amplitude and/or frequency parameter on the signal generator 148.

Optionally, in an aspect, SLB functionality may include controlling or selecting the blocking signal amplitude. For example, in one non-limiting aspect, a secondary directional antenna side-lobe 150 of the secondary directional antenna 134 may radiate toward the intended RFID tags 108 at a power that is 15 dB lower than the secondary directional antenna main lobe 136. If the directional coupler 124 directs about 6% or −15 dB of the output signal 122 of the RFID reader 102 as the tapped signal 128 to the SLB circuit 130, then the power of the signal radiated by the main directional antenna 106 toward the intended RFID tags 108 is +30 dB higher than the power of the signal radiated by the secondary directional antenna 134 toward the intended RFID tags 108. Accordingly, side-lobe radiations of the secondary directional antenna 134 do not significantly interfere with the reads of the intended RFID tags 108 via the main directional antenna 106.

In some alternative aspects, however, in order to improve SLB functionality in the unintended area 118, the directional coupler 124 may direct more than 6% of the output signal 122 of the RFID reader 102 as the tapped signal 128 to the SLB circuit 130, while in some other alternative aspects, in order to improve the read sensitivity/accuracy in the intended area 110, the directional coupler 124 may direct less than 6% of the output signal 122 of the RFID reader 102 as the tapped signal 128 to the SLB circuit 130. Accordingly, controlling or selecting the blocking signal amplitude in various aspects may allow for a tradeoff between improved SLB functionality in the unintended area 118 versus improved read sensitivity/accuracy in the intended area 110. The aforementioned tradeoff may be determined based on various criteria, for example, the requirements of a certain retailer, the type of the intended RFID tags 108 used in the second RFID system, the type of the stray RFID tags 116 used in the second RFID system 200, the size and/or configuration of the intended area 110 and/or unintended area 118, etc.

Optionally, in an aspect, the SLB signal 132 may include one signal, or may include a plurality of unrelated signals having different waveform shapes (e.g., square wave, sinusoid, etc.), different frequencies, etc.

For example, in one non-limiting aspect, a plurality of signals with different frequencies may be combined and applied as the SLB signal 132. As described above with reference to FIG. 2, at least one of such frequencies may be configured to prevent the stray RFID tags 116 from decoding the data encoded in the radiations from the main directional antenna 106, while at least another one of such frequencies may be configured to prevent the RFID reader 102 from decoding data encoded in signals backscattered by the stray RFID tags 116.

In another non-limiting aspect, for example, the stray RFID tags 116 may include different types of RFID tags. In this case, two or more signals with different frequencies may be combined and applied as the SLB signal 132, where a first signal with a first frequency is configured for preventing or reducing reads of a first type of stray RFID tags 116, a second signal with a second frequency is configured for preventing or reducing reads of a second type of stray RFID tags 116, and so on.

Optionally, in an aspect, the SLB functionality may include modulating or encoding data in the blocking signal. In one non-limiting aspect, for example, such modulated or encoded data in the blocking signal may allow for the RFID reader 102 to discern location or other information about the stray RFID tags 116 based on signals backscattered by the stray RFID tags 116.

In an alternative non-limiting aspect, the RFID reader 102 may be EPC compliant and may not be able to process the signals backscattered by the stray RFID tags 116 and/or may not have the capability to decode the modulated or encoded data in the blocking signal as backscattered by the stray RFID tags 116. However, the second RFID system 200 may include another component (not shown) such as a separate custom reader configured with additional capability to decode such data in order to discern location or other information about the stray RFID tags 116 based on signals backscattered by the stray RFID tags 116.

Optionally, in an aspect, the SLB signal data may be fixed or may be dynamically determined/modified according to information available to the RFID reader 102. For example, in one non-limiting aspect, the RFID reader 102 may read a stray RFID tag 116 and may determine to activate and/or modify SLB functionality in response to reading the stray RFID tag 116. For example, the RFID reader 102 may read a stray RFID tag 116 and may identify that the stray RFID tag 116 is unintentionally read based on a type or other information associated with the stray RFID tag 116. In this case, the RFID reader 102 may activate and/or modify SLB functionality (e.g., modify a frequency or an amplitude of the SLB signal 132) in response to reading the stray RFID tag 116.

Optionally, in an aspect, the SLB functionality may be subject to regulatory control in some regions, which may alter or limit some operational modes.

Optionally, in an aspect, the SLB functionality may be implemented using various side-band frequencies, amplitudes, and/or waveforms.

Optionally, in some aspects, RF shielding may be alternatively or additionally used to achieve SLB functionality.

Optionally, in some aspects, a tag-free zone may be established to alternatively or additionally achieve SLB functionality.

Optionally, in an alternative aspect, the SLB circuit 130 may be separate and disconnected from the RFID reader 102 and may generate an RF signal instead of using the tapped signal 128.

The present aspects are also applicable for SLB functionality in radar systems.

Figure 3:
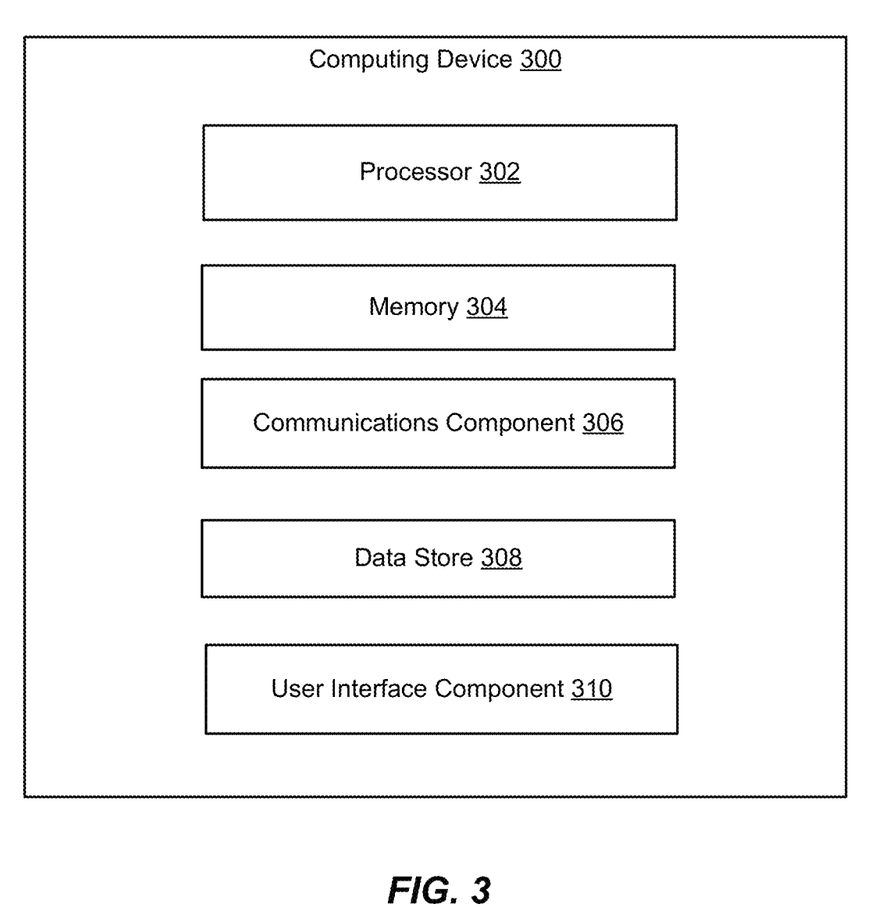
FIG. 3 is a block diagram of an example computing device which may implement a component in the example RFID systems of FIG. 1 or 2, according to aspects of the present disclosure.

FIG. 3 illustrates an example block diagram providing details of computing components in a computing device 300 that may implement all or a portion of the RFID reader 102, the intended RFID tags 108, the stray RFID tags 116, or any other component in the first RFID system 100 or in the second RFID system 200. The computing device 300 includes a processor 302 which may be configured to execute or implement software, hardware, and/or firmware modules that perform any functionality described herein with reference to the RFID reader 102, the intended RFID tags 108, the stray RFID tags 116, or any other component in the first RFID system 100 or in the second RFID system 200.

The processor 302 may be a micro-controller and/or may include a single or multiple set of processors or multi-core processors. Moreover, the processor 302 may be implemented as an integrated processing system and/or a distributed processing system. The computing device 300 may further include a memory 304, such as for storing local versions of applications being executed by the processor 302, related instructions, parameters, etc. The memory 304 may include a type of memory usable by a computer, such as random access memory (RAM), read only memory (ROM), tapes, magnetic discs, optical discs, volatile memory, non-volatile memory, and any combination thereof. Additionally, the processor 302 and the memory 304 may include and execute an operating system executing on the processor 302, one or more applications, display drivers, etc., and/or other components of the computing device 300.

Further, the computing device 300 may include a communications component 306 that provides for establishing and maintaining communications with one or more other devices, parties, entities, etc. utilizing hardware, software, and services. The communications component 306 may carry communications between components on the computing device 300, as well as between the computing device 300 and external devices, such as devices located across a communications network and/or devices serially or locally connected to the computing device 300. For example, the communications component 306 may include one or more buses, and may further include transmit chain components and receive chain components associated with a wireless or wired transmitter and receiver, respectively, operable for interfacing with external devices.

Additionally, the computing device 300 may include a data store 308, which can be any suitable combination of hardware and/or software, that provides for mass storage of information, databases, and programs. For example, the data store 308 may be or may include a data repository for applications and/or related parameters not currently being executed by processor 302. In addition, the data store 308 may be a data repository for an operating system, application, display driver, etc., executing on the processor 302, and/or one or more other components of the computing device 300.

The computing device 300 may also include a user interface component 310 operable to receive inputs from a user of the computing device 300 and further operable to generate outputs for presentation to the user (e.g., via a display interface to a display device). The user interface component 310 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 310 may include one or more output devices, including but not limited to a display interface, a speaker, a haptic feedback mechanism, a printer, any other mechanism capable of presenting an output to a user, or any combination thereof.

Figure 4:
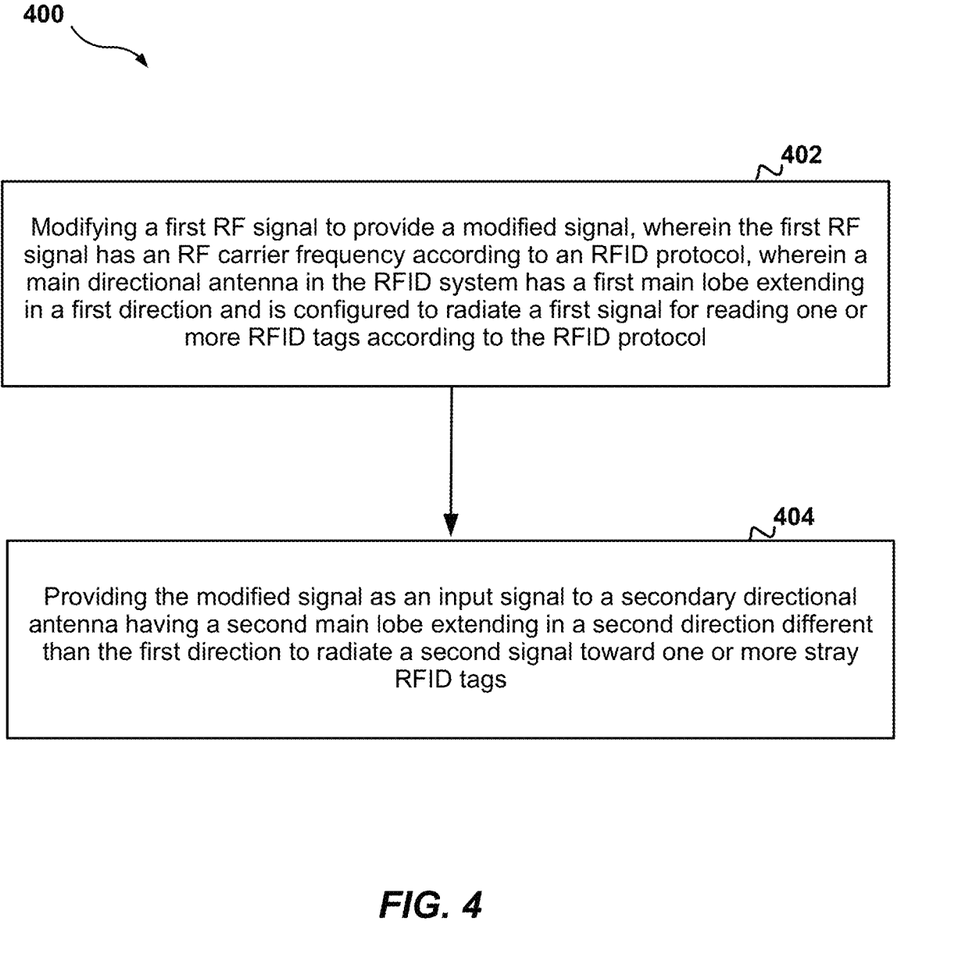
FIG. 4 is a flow diagram of an example method, according to aspects of the present disclosure.

FIG. 4 is a flowchart of a method 400 in an RFID system. The method 400 may implement the functionality described herein with reference to FIGS. 1-3 above, and may be performed by one or more components of the computing device 300 and/or one or more components in the first RFID system 100 or in the second RFID system 200, such as the RFID reader 102, the directional coupler 124, the SLB circuit 130, the main directional antenna 106, the secondary directional antenna 134, the intended RFID tags 108, the stray RFID tags 116, or any other component described herein with reference to FIGS. 1-3 above.

At 402, the method 400 includes modifying a first RF signal to provide a modified signal, wherein the first RF signal has an RF carrier frequency according to an RFID protocol, wherein a main directional antenna in the RFID system has a first main lobe extending in a first direction and is configured to radiate a first signal for reading one or more RFID tags according to the RFID protocol. For example, in an aspect, referring to FIG. 2, the RF mixer 140 modulates the tapped signal 128 with the modulating signal 142 to provide a modulated signal as the SLB signal 132. The tapped signal 128 is tapped from the output signal 122 of the RFID reader 102 and is an RF signal having an RF carrier frequency according to an RFID protocol used in the second RFID system 200. The main directional antenna 106 in the second RFID system 200 has the main lobe 112 extending in the forward direction 120 and is configured to radiate a first signal 121 for reading the intended RFID tags 108 according to the RFID protocol.

At 404, the method include providing the modified signal as an input signal to a secondary directional antenna having a second main lobe extending in a second direction different than the first direction to radiate a second signal toward one or more stray RFID tags. For example, in an aspect, referring to FIG. 2, the RF mixer 140 provides the SLB signal 132 as an input signal to the secondary directional antenna 134 which has a secondary antenna main lobe 136 extending in a second direction 138 different than the forward direction 120 to radiate a second signal toward one or more stray RFID tags 116.

Optionally, in an aspect, the modifying includes modulating, by an RF mixer, the first RF signal with a modulating signal to provide a modulated signal as the modified signal.

Optionally, in an aspect, the modulating signal has one or more frequencies corresponding to one or more sub-carriers on the RF carrier frequency.

Optionally, in an aspect, one or more parameters of one or more sub-carriers in the modified signal are adjusted according to the RFID protocol for encoding first data in the first signal radiated by the main directional antenna or for encoding second data in a third signal backscattered by an RFID tag.

Optionally, in an aspect, the method 400 may further include generating a second RF signal by an RFID reader.

Optionally, in an aspect, the method 400 may further include tapping the second RF signal by a directional coupler to split a power of the second RF signal into a third RF signal and a tapped RF signal.

Optionally, in an aspect, the method 400 may further include providing the third RF signal by the directional coupler as an input to the main directional antenna.

Optionally, in an aspect, the method 400 may further include providing the tapped RF signal by the directional coupler to a circulator.

Optionally, in an aspect, the method 400 may further include directing the tapped RF signal by the circulator to the RF mixer as the first RF signal.

Optionally, in an aspect, the tapped RF signal has lower power compared to the third RF signal.

Optionally, in an aspect, the tapped RF signal has 15 dB lower power compared to the third RF signal.

Optionally, in an aspect, the modulating signal is a square wave or a sine wave.

Optionally, in an aspect, the method 400 may further include adjusting a parameter of the modulating signal, for example, based on a tag reading result of an RFID reader in the RFID system.

Optionally, in an aspect, the parameter comprises an amplitude, a frequency, or a waveform shape of the modulating signal.

Optionally, in an aspect, the method 400 may further include selectively turning the modulating signal on or off.

As disclosed, aspects of the present disclosure provide an RFID system.

In an aspect, the RFID system includes a signal generator configured for generating a modulating signal; and an RF mixer configured for modulating a first RF signal with the modulating signal to provide a modulated signal, wherein the first RF signal has an RF carrier frequency according to an RFID protocol, wherein a main directional antenna in the RFID system has a first main lobe extending in a first direction and is configured to radiate a first signal for reading one or more RFID tags according to the RFID protocol, wherein the RF mixer is further configured to provide the modulated signal as an input signal to a secondary directional antenna having a second main lobe extending in a second direction different than the first direction to radiate a second signal toward one or more stray RFID tags.

Optionally, in an aspect, the modulating signal has one or more frequencies corresponding to one or more sub-carriers on the RF carrier frequency.

Optionally, in an aspect, one or more parameters of one or more sub-carriers in the modified signal are adjusted according to the RFID protocol for encoding first data in the first signal radiated by the main directional antenna or for encoding second data in a third signal backscattered by an RFID tag.

Optionally, in an aspect, the RFID system further includes an RFID reader configured for generating a second RF signal; a directional coupler configured for tapping the second RF signal to split a power of the second RF signal into a third RF signal and a tapped RF signal, and further configured for providing the third RF signal as an input to the main directional antenna; and a circulator configured to direct the tapped RF signal from the directional coupler to the RF mixer as the first RF signal.

Optionally, in an aspect, the tapped RF signal has 15 dB lower power compared to the third RF signal.

Optionally, in an aspect, the RFID reader is further configured to adjust a parameter of the modulating signal, for example, based on a tag reading result.

Optionally, in an aspect, the parameter comprises an amplitude, a frequency, or a waveform shape of the modulating signal.

Optionally, in an aspect, the RFID reader is further configured to selectively turn the modulating signal on or off.

Optionally, in an aspect, the RFID system further includes the main directional antenna.

Optionally, in an aspect, the RFID system further includes the secondary directional antenna.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method in a radio-frequency (RF) identification (RFID) system, comprising:
    modulating a first RF signal to provide a modulated signal, wherein the first RF signal has an RF carrier frequency according to an RFID protocol;
    providing the first RF signal to a main directional antenna in the RFID system to radiate a first signal toward a first main lobe of the main directional antenna for reading one or more RFID tags according to the RFID protocol, wherein the first RF signal further causes the main directional antenna to radiate an unintended signal toward a side-lobe of the main directional antenna; and
    providing the modulated signal to a secondary directional antenna installed back to back with the main directional antenna and having a second main lobe extending in a same direction as the side-lobe of the main directional antenna to radiate a second signal toward the second main lobe of the secondary directional antenna to reduce or prevent a reading of one or more stray RFID tags by the RFID system due to the unintended signal.

2. The method of claim 1, wherein the modulating comprises modulating, by an RF mixer, the first RF signal with a modulating signal to provide the modulated signal.

3. The method of claim 2, wherein the modulating signal has one or more frequencies corresponding to one or more sub-carriers on the RF carrier frequency.

4. The method of claim 3, wherein one or more parameters of the one or more sub-carriers in the modulated signal are adjusted according to the RFID protocol for encoding first data in the first signal radiated by the main directional antenna or for encoding second data in a third signal backscattered by an RFID tag.

5. The method of claim 2, further comprising:
    generating a second RF signal by an RFID reader;
    tapping the second RF signal by a directional coupler to split a power of the second RF signal into a third RF signal and a tapped RF signal;
    providing the third RF signal by the directional coupler as an input to the main directional antenna;
    providing the tapped RF signal by the directional coupler to a circulator; and
    directing the tapped RF signal by the circulator to the RF mixer as the first RF signal.

6. The method of claim 5, wherein the tapped RF signal has lower power compared to the third RF signal.

7. The method of claim 2, wherein the modulating signal is a square wave or a sine wave.

8. The method of claim 2, further comprising adjusting a parameter of the modulating signal.

9. The method of claim 8, wherein the parameter comprises an amplitude, a frequency, or a waveform shape of the modulating signal.

10. The method of claim 8, wherein the adjusting comprises adjusting the parameter of the modulating signal based on a tag reading result of an RFID reader in the RFID system.

11. The method of claim 8, further comprising selectively turning the modulating signal on or off.

12. The method of claim 1, wherein the second signal is configured to be superimposed on the first signal to prevent the one or more stray RFID tags from responding to the first signal, or to prevent the main directional antenna from decoding data in a response signal from the one or more stray RFID tags.

13. The method of claim 1, wherein the main directional antenna and the secondary directional antenna that are installed back to back have a same aspect ratio and a same mounting system.

14. The method of claim 1, wherein the main directional antenna and the secondary directional antenna that are installed back to back are substantially identical.

15. A radio-frequency (RF) identification (RFID) system, comprising:
a signal generator configured for generating a modulating signal; and
an RF mixer configured for modulating a first RF signal with the modulating signal to provide a modulated signal,
wherein the first RF signal has an RF carrier frequency according to an RFID protocol,
wherein the signal generator provides the first RF signal to a main directional antenna in the RFID system to radiate a first signal toward a first main lobe of the main directional antenna for reading one or more RFID tags according to the RFID protocol,
wherein the first RF signal further causes the main directional antenna to radiate an unintended signal toward a side-lobe of the main directional antenna,
wherein the RF mixer is further configured to provide the modulated signal to a secondary directional antenna installed back to back with the main directional antenna and having a second main lobe extending in a same direction as the side-lobe of the main directional antenna to radiate a second signal toward the second main lobe of the secondary directional antenna to reduce or prevent a reading of one or more stray RFID tags by the RFID system due to the unintended signal.

16. The RFID system of claim 15, wherein the modulating signal has one or more frequencies corresponding to one or more sub-carriers on the RF carrier frequency.

17. The RFID system of claim 15, wherein one or more parameters of one or more sub-carriers in the modulated signal are adjusted according to the RFID protocol for encoding first data in the first signal radiated by the main directional antenna or for encoding second data in a third signal backscattered by an RFID tag.

18. The RFID system of claim 15, further comprising:
an RFID reader configured for generating a second RF signal;
a directional coupler configured for tapping the second RF signal to split a power of the second RF signal into a third RF signal and a tapped RF signal, and further configured for providing the third RF signal as an input to the main directional antenna; and
a circulator configured to direct the tapped RF signal from the directional coupler to the RF mixer as the first RF signal.

19. The RFID system of claim 18, wherein the RFID reader is further configured to adjust a parameter of the modulating signal.

20. The RFID system of claim 19, wherein the parameter comprises an amplitude, a frequency, or a waveform shape of the modulating signal.

21. The RFID system of claim 19, wherein the RFID reader is further configured to adjust the parameter of the modulating signal based on a tag reading result of the RFID reader in the RFID system.

22. The RFID system of claim 19, wherein the RFID reader is further configured to selectively turn the modulating signal on or off.

* * * * *